Patented June 15, 1943

2,321,913

UNITED STATES PATENT OFFICE

2,321,913

HYDROGENATION TREATMENT OF OILS AND FATS

Douglas J. Hennessy, Teaneck, N. J., assignor to Vitamoil Laboratory, Inc., a corporation of New Jersey No Drawing. Application December 6, 1940, Serial No. 368,857

4 Claims. (Cl. 260—420)

This invention in certain of its broader aspects relates to an improvement in the hydrogenation treatment of oils and fats of animal and vegetable origin whereby the undesirable flavor heretofore considered to be an inevitable consequence of the hydrogenation treatment, and which is sometimes referred to as "hydrogenation flavor," is eliminated or inhibited in the course of the hydrogenation treatment and without recourse to subsequent steam or other gas washing treatments at reduced pressure or similar relatively tedious and expensive procedures.

One of the more particular applications of my invention has to do with the treatment of vitamin-containing marine oils to produce therefrom oil products that are not only free from "fish" odor and flavor but also are free from other undesirable odors and flavors that are usually possessed by such oils. This particular application of the principles of my present invention is an improvement upon the invention described in my copending application Ser. No. 345,412 filed July 13, 1940.

My invention further includes improvements in the treatment of vitamin-containing oils which have for their object to obtain products free from objectionable odors and flavors and further characterized by their stability and lessened tendency to become rancid.

In my aforesaid copending application I have described a procedure for removing fish odor and flavor from vitamin-containing marine oils involving a controlled hydrogenation treatment and having for its object to produce a product containing a large part of the original vitamin and provitamin values of the oil. While this procedure is very satisfactory from the standpoint that the fish odor and flavor are removed with only a moderate loss of vitamin values, nevertheless when the process is applied to the treatment of many marine oils the final product has certain undesirable flavor and odor characteristics. These appear in part to be a result of the hydrogenation treatment and in part to be due to residual non-fish odors and flavors present in the original oil but not detectable before the hydrogenation treatment because of the predominant fishy odor and flavor.

I have found that when the hydrogenation treatment designed to remove fish odor and flavor from marine oils is carried on in the presence of activated carbon, any tendency for the development of hydrogenation flavor in the treated oil is inhibited, and, moreover, that undesirable odors and flavors other than fish odor and flavor are eliminated. I have also found that this treatment can be carried on over a wide range of temperatures and pressures both within and outside the ranges where the removal of fish odor and flavor can be effected without any great loss of the vitamin values. In addition to its application in the treatment of marine oils, this improved method may be applied in the hydrogenation treatment of any oil or fat of animal or vegetable origin which it is desired shall be free from hydrogenation flavor, as for example, in preparing hardened fats for edible purposes, and for use in soap making.

I have further found that the elimination from vitamin-containing marine oils of undesirable odors and flavors, besides fish odor and flavor, is promoted and at the same time the loss of vitamin values is kept within small proportions by carrying on the deodorizing hydrogenation treatment in two stages. In the first stage the oil is subjected to hydrogenation for a limited period of time at a moderately high temperature and at a pressure so correlated with relation thereto as to effect elimination of fish odor and flavor and to bring about stable combinations of the substances that normally tend to produce fish odor and flavor without, at the same time, rapidly destroying vitamin values. Before the treatment has been carried to the point where there is a marked drop in the vitamin values, I lower the temperature to a point below that at which substantial destruction of vitamin values will take place, and then carry on a further hydrogenation at this lower temperature and at an appropriate pressure for the purpose of removing other undesirable odors or flavors. This two-stage treatment when carried on without the use of activated carbon will effect not only the elimination of the fish odor and flavor but also bring about a substantial reduction and sometimes a complete elimination of other undesirable odors and flavors, except that there will still persist more or less hydrogenation taste or flavor.

While either of the procedures above outlined may be applied to advantage in the treatment of vitamin-containing marine oils with a view to obtaining an odorless and bland product containing a high content of vitamins, I find it desirable to combine the activated carbon treatment with the two-stage treatment to insure the desired ultimate relatively stable vitamin-containing product, since in this way the drop in vitamin values is minimized and complete elimination of undesirable odors and flavors, including hydrogenation flavor, is insured.

I am aware of the fact that it has been proposed to use activated carbon in filtering operations for the purpose of removing odors and flavors from various liquids, and, to a certain extent and with some liquids, activated carbon will work for this purpose. However, the odors and flavors imparted in the hydrogenation treatment of animal and vegetable oils and fats or otherwise present or retained therein are not completely removed when activated carbon is used in this manner, and I believe it to be quite unexpected that a different result is obtained when the activated carbon is present in the hydrogenation zone during the course of the hydrogenation reactions.

I find that the desired complete deodorization and removal of undesirable flavors, including the hydrogenation flavor, will be effected when a quantity of activated carbon is used in the range of 0.1% to 5% based on the weight of oil used. By way of example and without desiring to be limited thereto, I have found, in treating vitamin-containing marine oils, that when the hydrogenation conducted in the presence of activated carbon is carried on for from 10 to 40 minutes at a temperature of from 80° to 95° C. and a hydrogen pressure of 50 to 500 lbs. per square inch, the desired elimination of objectionable odors and flavors will have been brought about. When it is desired to conserve the vitamin A potency of the oil to a greater extent, the hydrogenation may be carried out in two stages and with the use of activated carbon, the higher temperature phase of the operation being carried on at a temperature of from 80° to 95° C. for a short period, say from 10 to 40 minutes and usually not more than 20 minutes. The subsequent low temperature hydrogenation may then be carried on at from 50° to 65° C. with a hydrogen pressure of from 200 to 500 lbs. per square inch. The desired results are usually obtained when the low temperature treatment has been continued from 1 to 3 hours.

When the activated carbon treatment is applied in connection with the hydrogenation of an oil or fat without regard to the recovery of a high proportion of vitamin values or is applied to an oil or fat containing an indifferent amount of vitamin values that are affected by the temperatures maintained in the hydrogenation process, the temperatures and pressures employed may be varied over a wide range including the operating temperature and pressure conditions maintained in the various types of hydrogenating treatments employed in hardening oils and fats for edible purposes, for soap making, for use in paints, waterproofing compositions and for various other purposes to which hydrogenated oils and fats have been used in the arts.

Typical examples of procedures involving the use of activated carbon according to the principles of this invention in treating vitamin-containing oils and the results obtained are set forth below:

EXAMPLE I

This run was conducted on pollock liver oil assaying 9600 vitamin A units per gram, measured by the optical method. An operating temperature of 85° C. and a hydrogen pressure of 250 lbs. per square inch were employed. A nickel catalyst made by the Intermetal Corporation and known as their "Type D-3" was used in the proportion of 75 grams of the catalyst to one gallon of the oil. This catalyst contained approximately 33⅓% nickel. In addition, 17 grams of type D-60 activated carbon obtained from the Darco Corporation and 4 grams of "Hyflo Super-Cel" filter aid, manufactured by Johns-Manville, were introduced into the converter with the catalyst, when the temperature of the oil had been brought up to 85° C. The oil, catalyst and carbon were subjected to agitation during the hydrogenation treatment which was carried on for a period of 20 minutes.

At the conclusion of this treatment the oil was filtered. The final product was a clear oil entirely free from fish odor and flavor and the only discernible odor suggested melted butter. This product assayed approximately 8600 vitamin A units per gram, indicating a vitamin recovery of approximately 89%.

EXAMPLE II

This run was conducted on pollock liver oil assaying 8800 vitamin A units by the optical method. The hydrogenation was carried on at a temperature of from 85° to 95° C. and a hydrogen pressure of 250 lbs. per square inch for a period of 20 minutes. A commercial nickel catalyst assaying 25% nickel and obtained from the Rufert Chemical Company was employed in the proportion of 75 grams of catalyst to one gallon of oil and 63 grams of Darco activated carbon, type D-60, were introduced into the oil with the catalyst. The resulting product showed improvement similar to the product of the operation described under Example I and a final assay of 8100 vitamin A units, indicating a recovery of approximately 92%.

EXAMPLE III

This run was conducted on Eastman "Vitamin A Concentrate" obtained from Distillation Products, Inc. of Rochester, New York, and contained 219,000 vitamin A units per gram before the treatment. This material was subjected to a hydrogenation treatment at a temperature of 85° C. and a hydrogen pressure of 250 lbs. per square inch for a period of 20 minutes. 75 grams of D-3 type, Intermetal catalyst, containing 33⅓% nickel, was employed per gallon of concentrate. To this mixture 35 grams of D-60 type Darco activated carbon and 5 grams of "Hyflo Super-Cel" were introduced per gallon of concentrate. At the end of the 20 minutes' treatment the temperature was reduced to 55° C. and the operation continued for an additional 60 minutes at the same hydrogen pressure. The final product assayed 204,000 units of vitamin A per gram, measured by the optical method, thus indicating a recovery of approximately 90% of the vitamin A. The final product filtered a clear amber and was entirely free of fish odor and flavor as well as free from hydrogenation flavor.

The process is similarly applicable to the treatment of other vitamin-containing marine oils including not only the more commonly known fish liver oils such as those of cod, halibut, and shark, but also those of albacore, burbot, dogfish, haddock, hake, topefish, herring, ling, plaice, salmon, puffer, skate, *Stereolopis ishinagi*, *Raja calvata* and seagull. It is also applicable to the treatment of the various fish oils containing vitamins, as for example, the eel, herring, sardine, menhaden and salmon oils. Moreover, as hereinbefore noted, the process is not confined in its application to the treatment of vitamin-containing oils or to marine oils. In fact, it may be applied in eliminating or inhibiting hydrogenation flavor in connection with the hydrogenation treatment of any oil or fat of animal or vegetable origin.

While it is well known that hydrogenation flavor can be removed from hydrogenated oils and fats by resort to steam treatments or gas washing processes, usually carried on at reduced pressures, these procedures are tedious, time consuming and consequently expensive, and, moreover, when steam is used as the washing agent, particularly when treating vitamin-containing oils, there is a tendency for the steam to react with the constituents of the oil to establish an unstable condition which will cause the oil to develop odor and flavor in storage.

In the foregoing description I have described improvements in the hydrogenation treatment of vitamin-containing marine oils having for their object to obtain an oil that is free from fish odor and flavor as well as other undesirable odors and flavors, including hydrogenation flavor. In my investigations of the improved oil products so obtained, I have conducted tests on these products with a view to determining their ability to withstand oxidation and other deterioration under different conditions apt to be met with in the storing and use of these products. Among other tests to which these products have been subjected is an accelerated oxidative rancidity test wherein the oil, both in its untreated and treated state, was placed in open beakers in an oven maintained at a temperature of 50° C. and samples were taken and tested for rancidity and for vitamin A value after different prolonged periods. The results of these tests revealed that the treated oil showed a greater tendency to become rancid and also a greater loss of vitamin A value under the conditions of the test for each period. From this it may be inferred that the hydrogenation treatment either renders inactive or destroys at least a part of the natural antioxidant substances present in the oil, and this may be one reason why prior workers have not observed satisfactory results in their investigations of the possibilities of deodorizing vitamin-containing marine oils by means of hydrogenation treatments.

I have further found that the greater tendency of the treated oil to become rancid and for the vitamin values thereof to be destroyed in the course of the accelerated oxidative test may be overcome by adding any of various known antioxidant materials in appropriate amounts to the treated oil. My test with several antioxidant materials obtained from vegetable sources, including soya bean lecithin, the various vitamin E extractives, and the extractive that is derived from raw coffee beans, show that when such an antioxidant material in a proportion of around .2%, or in some cases even substantially less, is added, the tendency of the vitamin A potentcy to drop in the course of an accelerated oxidative rancidity test is greatly retarded and that a product having highly stable properties as regards its vitamin A potentcy is obtained.

In my tests on rancidity and retention of vitamin A potency under accelerated oxidative conditions, I found that in all cases the hydrogenated oils have much lower resistance to rancidity than the untreated oils but that the addition of antioxidant material, preferably from natural food sources, not only improves the resistance to oxidative rancidity but when added in a sufficient amount will bring the resistance to rancidity higher than it was originally.

In my investigations I have also considered the effect of the presence of free acid in the oil, and tests were conducted with oil that had been subjected to a previous treatment to remove free acid and similar tests were conducted on an oil which had been subjected to a preliminary alkaline wash to remove free acid. I have found that in each instance the removal of the free organic acids present in the oil tended to insure the production of an ultimate product having greater resistance to onset of rancidity, but that the removal of the acid did nothing toward retaining the vitamin A potency. On the contrary, some of the natural antioxidant of the oil appears to be removed in the alkaline wash. At the same time, an oil that has been preliminarily treated to remove free acid and then subjected to a deodorizing hydrogenation treatment such as hereinbefore described has a more bland flavor and other noticeably improved characteristics as compared to otherwise identical oil subjected to the same hydrogenation treatment but which has not been first treated to remove free acid. Therefore, in all instances where a product of the highest quality is desired, the oil should be given a preliminary treatment to remove acid or at least bring the acid content down to not more than .3%, calculated as oleic acid.

I set forth below the results of accelerated oxidative rancidity tests conducted on two pollock liver oils. In Table I are set forth the results obtained by treating the oil which I have identified as No. 1 and which had a vitamin A potency in its untreated state of 8900 units. This oil had a free acid content of 1.36%, calculated as oleic acid. In Table II are shown the results of treatment of a generally similar pollock liver oil which had been given an alkaline wash to remove free acid and had an acid content of .07%, calculated as oleic acid. This oil showed a vitamin A potency of 7800 units when measured by the optical method. In each instance the oxidative rancidity test was conducted by exposing the oil in open vessels in air at 50° C. for the periods respectively indicated.

TABLE I

Vitamin A values at end of periods indicated

| Time (hrs.) | Untreated oil | Treated oil [1] | The same treated oil with antioxidant added | Untreated oil with antioxidant added |
| --- | --- | --- | --- | --- |
| 18 | 7,420 | 4,910 | 7,430 | 8,040 |
| 30 | 6,820 | [2] 3,695 | 7,440 | 8,070 |
| 42 | 5,160 | [2] 2,090 | [3] 7,140 | 7,770 |

[1] The same oil after it had been hydrogenated in the presence of activated carbon according to the procedures hereinabove outlined to remove odor and which, at the beginning of the test, was free from fish odor and other undesirable odors and flavors including hydrogenation flavor. This oil at the beginning of the oxidative test showed a vitamin A potency of approximately 8,000 units.
[2] This oil when tested at the end of the 30 and 42 hour periods had become rancid.
[3] This oil at the end of the 42 hour period had become very slightly rancid.

TABLE II

Vitamin A values at end of periods indicated

| Time (hrs.) | Untreated oil | Treated oil [4] | The same treated oil with antioxidant added | Untreated oil with antioxidant added |
| --- | --- | --- | --- | --- |
| 18 | 5,510 | 4,890 | 6,680 | 7,160 |
| 30 | 4,680 | 3,820 | 6,540 | 7,060 |
| 42 | 3,340 | 2,300 | 5,860 | 6,420 |

[4] This oil at the beginning of the oxidative test showed a vitamin A potency of 7,050 units.

It is to be understood that the accelerated oxidative rancidity test to which the oil samples were subjected is a severe test intended to develop in a period of hours effects that may not be normally expected to be observed except after the oils have been stored for months, or even years. However, it is believed that these results are helpful to explain why the deodorized marine oils have heretofore shown instability in storage and a tendency to drop in vitamin A value.. Moreover, I claim as a part of my invention the production of deodorized vitamin-containing oils and concentrates which are novel in that they are not only permanently free of fish odor and flavor but are also free from hydrogenation flavor and highly resistant to oxidative rancidity. At the same time they possess novelty in that they are much more stable as respects their vitamin A potency.

In treating vitamin-containing marine oils according to the procedures outlined herein to recover a product characterized by vitamin potency, it is to be understood that the most uniform and optimum results, from the standpoint of the retention of the vitamin values of the original oil, will be obtained if the hydrogenation is controlled with respect to operating temperatures and the duration of treatment in the manner outlined more specifically in my copending application Ser. No. 345,412. In other words, if the destruction of vitamin A and related factors is to be kept low, the temperature and pressure should be so correlated within the temperature range of 20 to 95° C. and a hydrogen pressure of between 50 and 500 lbs. per square inch, that the destruction of the vitamin A content of the oil is kept within relatively low proportions. As pointed out in my copending application aforesaid, the kind and state of activity of the catalyst will also influence the selection of the optimum temperature and pressure conditions within the range above stated. A still further important factor of control pointed out in my copending application, which should be observed in practising the procedures disclosed herein, is the reduction in iodine value of the oil. Varying somewhat with the kind and state of the oil under treatment, I have found that the degree of hydrogenation sufficient to insure the desired deodorization will have been attained by discontinuing the hydrogenation when the iodine value of the oil has been only moderately reduced and that usually it is inadvisable to continue the hydrogenation to a point where there is a reduction of iodine number of more than 8. In some cases an iodine reduction of but one number has been sufficient to insure the desired deodorization. A suitable preliminary test will indicate the optimum point at which the hydrogenation of a given oil should be discontinued.

By observing the above-mentioned conditions I have found that it is possible to conserve at least 85% of the vitamin value of the oil and yet produce an oil product free from fish and other undesirable odors and having a bland flavor, and particularly having no objectionable hydrogenation flavor. Still higher recoveries are indicated by combining the procedures outlined in this specification with the teaching of my earlier copending application. Where in the appended claims I have referred to the recovery of substantially all of the vitamin values, it will be understood that I mean to include a product wherein approximately 85% or more of the vitamin A value of the original oil is retained in the final product.

As has been brought out in one of the specific examples, my invention is equally as applicable to the treatment of vitamin concentrates derived from marine oils, and particularly fish liver oils, as it is applicable to the treatment of the oil itself either in the raw state or in any degree of refinement.

In the preceding portions of this specification I have referred generally to the treatment of vitamin-containing marine oils and have cited particular examples of the treatment of such oils with minimum loss of vitamin A values. It will be understood that the principles of the invention are equally applicable in the treatment of such oils that may not be rich in vitamin A values, but do have a substantial content of vitamin D or other vitamin values. By way of example, the treatment of sardine oil, which is relatively rich in vitamin D values but contains little vitamin A, may be mentioned. In cases where both vitamins A and D are present in substantial amount, the carrying on of the treatment wtih due respect to the effect of temperature on the vitamin A content will insure a satisfactory recovery of vitamin D, which is recognized as being more resistant to heat than vitamin A. When the process is being applied with the primary object of recovery of vitamin D, it will be understood that the temperatures employed may be raised somewhat above those advised when aiming to recover a high yield of vitamin A and that the temperatures in the two-stage treatment may be correspondingly modified, the limiting temperature in the higher temperature stage of the treatment being that at which the vitamin D is destroyed at a substantial rate or in a substantial amount during the period of treatment selected.

It is to be understood that various changes and modifications may be made in the details of the procedures outlined herein, and that likewise the product may be modified in various ways not affecting the essential features set forth herein and in the appended claims.

I claim:

1. In the treatment of marine oils to remove fish odors and flavors and to produce an oil product having a bland flavor and substantially free from hydrogenation flavor, the steps which comprises subjecting the oil to catalytic hydrogenation while maintaining temperature and pressure conditions such as to promote elimination of fish odors and flavors, continuing this treatment until the fish odors and flavors are substantially removed and finally subjecting the so deodorized and deflavored oil to a further hydrogenation treatment carried on at relatively low temperature and in the presence of activated carbon, whereby to produce a final product substantially free from undesirable fish odors and flavors and free from hydrogenation flavor.

2. The process of treating a marine oil containing vitamins to remove fish odor and flavor and produce an oil product containing substantially the original content of the vitamins and related accessory food factors, which comprises subjecting the marine oil to catalytic hydrogenation at a temperature of about 95° C. and a hydrogen pressure of at least 50 lbs. per square inch, continuing the treatment until the fish odor and flavor have been substantially removed, thereupon reducing the temperature to below about 65° C., and then further hydrogenating the oil within said reduced temperature range to remove hydrogenation flavor imparted in the higher temperature treatment stage of the process.

3. The process of treating a marine oil to remove fish odor and flavor and produce an oil characterized by freedom from fish odor and having a bland flavor, which comprises subjecting the marine oil to catalytic hydrogenation at a temperature of between 20° C. and 95° C. and a hydrogen pressure so correlated to the temperature within the pressure range of 50 to 500 lbs. per square inch that conditions are established favoring conversion of odorous substances present into stable combinations substantially free of fish odor and flavor, continuing said treatment until the fish odor and flavor are substantially eliminated, and thereafter further hydrogenating the oil at a temperature below about 65° C. to remove hydrogenation flavor imparted in the first-mentioned stage of the treatment.

4. The process of treating a marine oil containing vitamins to remove fish odor and flavor and produce an oil product containing substantially the original content of the vitamins and related accessory food factors, which comprises subjecting the marine oil to catalytic hydrogenation at a temperature of from 80° to 95° C. and a hydrogen pressure of 50 to 500 lbs. per square inch for a period of from 10 to 40 minutes sufficient to remove fish odor and flavor, thereupon reducing the temperature to not more than 65° C. and then further hydrogenating the oil at a temperature between 50° and 65° C. with a hydrogen pressure of from 200 to 500 lbs. per square inch to remove hydrogenation flavor imparted in the higher temperature treatment stage of the process, and thereby obtaining a deodorized and deflavored oil product containing a large proportion of the vitamin values of the original oil.

DOUGLAS J. HENNESSY.

CERTIFICATE OF CORRECTION.

Patent No. 2,321,913.

June 15, 1943.

DOUGLAS J. HENNESSY.

It is hereby certified that error appears in the printed specification of the above numbered patent requiring correction as follows: Page 3, first column, line 68, after the word "had" insert --not--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.